(12) United States Patent
Burd et al.

(10) Patent No.: US 8,800,290 B2
(45) Date of Patent: Aug. 12, 2014

(54) COMBUSTOR

(75) Inventors: Steven W. Burd, Cheshire, CT (US); Stephen K. Kramer, Cromwell, CT (US); John T. Ols, Coventry, CT (US); Albert K. Cheung, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1654 days.

(21) Appl. No.: 11/958,716

(22) Filed: Dec. 18, 2007

(65) Prior Publication Data
US 2009/0151360 A1    Jun. 18, 2009

(51) Int. Cl.
*F02C 1/00* (2006.01)

(52) U.S. Cl.
USPC .................................. 60/749; 60/737; 60/740

(58) Field of Classification Search
USPC ........... 60/748, 737, 738, 740, 742, 746, 747, 60/749, 751
See application file for complete search history.

(56) References Cited

U.S. PATENT DOCUMENTS

| | | | | |
|---|---|---|---|---|
| 2,720,080 A | * | 10/1955 | Oulianoff | 60/804 |
| 2,920,449 A | * | 1/1960 | Johnson et al. | 60/739 |
| 2,938,344 A | * | 5/1960 | Markowski | 60/749 |
| 3,817,690 A | * | 6/1974 | Bryce et al. | 431/350 |
| 4,150,539 A | * | 4/1979 | Rubins et al. | 60/39.23 |
| 4,362,021 A | * | 12/1982 | Willis | 60/737 |
| 4,374,466 A | * | 2/1983 | Sotheran | 60/804 |
| 5,363,643 A | * | 11/1994 | Halila | 60/796 |
| 5,396,763 A | * | 3/1995 | Mayer et al. | 60/765 |
| 5,435,139 A | | 7/1995 | Pidcock et al. | |
| 5,619,855 A | * | 4/1997 | Burrus | 60/736 |
| 5,758,503 A | | 6/1998 | DuBell et al. | |
| 5,791,148 A | * | 8/1998 | Burrus | 60/752 |
| 5,966,937 A | | 10/1999 | Graves | |
| 6,295,801 B1 | * | 10/2001 | Burrus et al. | 60/776 |
| 6,606,861 B2 | | 8/2003 | Snyder | |
| 7,093,439 B2 | | 8/2006 | Pacheco-Tougas et al. | |
| 7,241,108 B2 | | 7/2007 | Lewis | |
| 2004/0020211 A1 | * | 2/2004 | Kendrick et al. | 60/750 |
| 2007/0190473 A1 | * | 8/2007 | Sullivan | 431/354 |

* cited by examiner

*Primary Examiner* — Gerald L Sung
(74) *Attorney, Agent, or Firm* — Bachman & LaPointe, P.C.

(57) ABSTRACT

A gas turbine engine combustor has inboard and outboard walls. A forward bulkhead extends between the walls and cooperates therewith to define a combustor interior volume. Bluff body fuel injectors are along the bulkhead.

23 Claims, 7 Drawing Sheets

US 8,800,290 B2

COMBUSTOR

U.S. GOVERNMENT RIGHTS

The invention was made with U.S. Government support under contract N00421-96-C-5168 awarded by the U.S. Navy. The U.S. Government has certain rights in the invention.

BACKGROUND

This disclosure relates to combustors, and more particularly to combustors for gas turbine engines.

Gas turbine engine combustors may take several forms. An exemplary class of combustors features an annular combustion chamber having forward/upstream inlets for fuel and air and aft/downstream outlet for directing combustion products to the turbine section of the engine. An exemplary combustor features inboard and outboard walls extending aft from a forward bulkhead in which swirlers are mounted and through which fuel nozzles/injectors are accommodated for the introduction of inlet air and fuel. Exemplary walls are double structured, having an interior heat shield and an exterior shell. Exemplary heat shield constructions are shown in U.S. Pat. No. 5,758,503. Exemplary film cooling panel apertures are shown in U.S. Pat. Nos. 6,606,861 and 7,093,439. Further details of an exemplary swirler are disclosed in U.S. Pat. No. 5,966,937.

SUMMARY

One aspect of the disclosure involves a gas turbine engine combustor having inboard and outboard walls. A forward bulkhead extends between the walls and cooperates therewith to define a combustor interior volume. Bluff body fuel injectors are accommodated by the bulkhead to create turbulent recirculation regions for promoting flame stability.

The details of one or more embodiments are set forth in the accompanying drawing and the description and claims below.

BRIEF DESCRIPTION OF THE DRAWING

Like reference numbers and designations in the various drawings indicate like elements.

DETAILED DESCRIPTION

Figure 1:
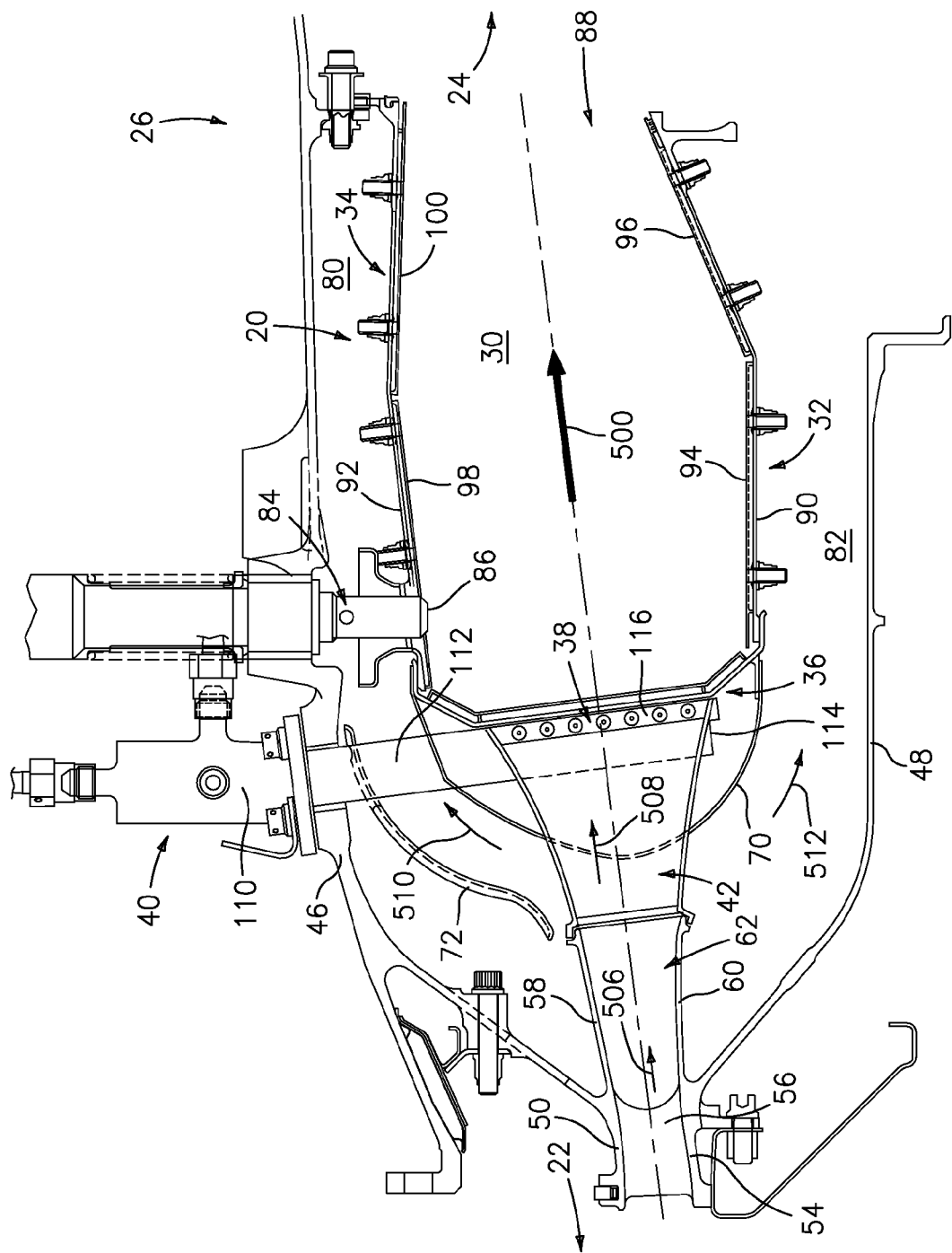
FIG. 1 is a longitudinal sectional view of a gas turbine engine combustor.
Figure 2:
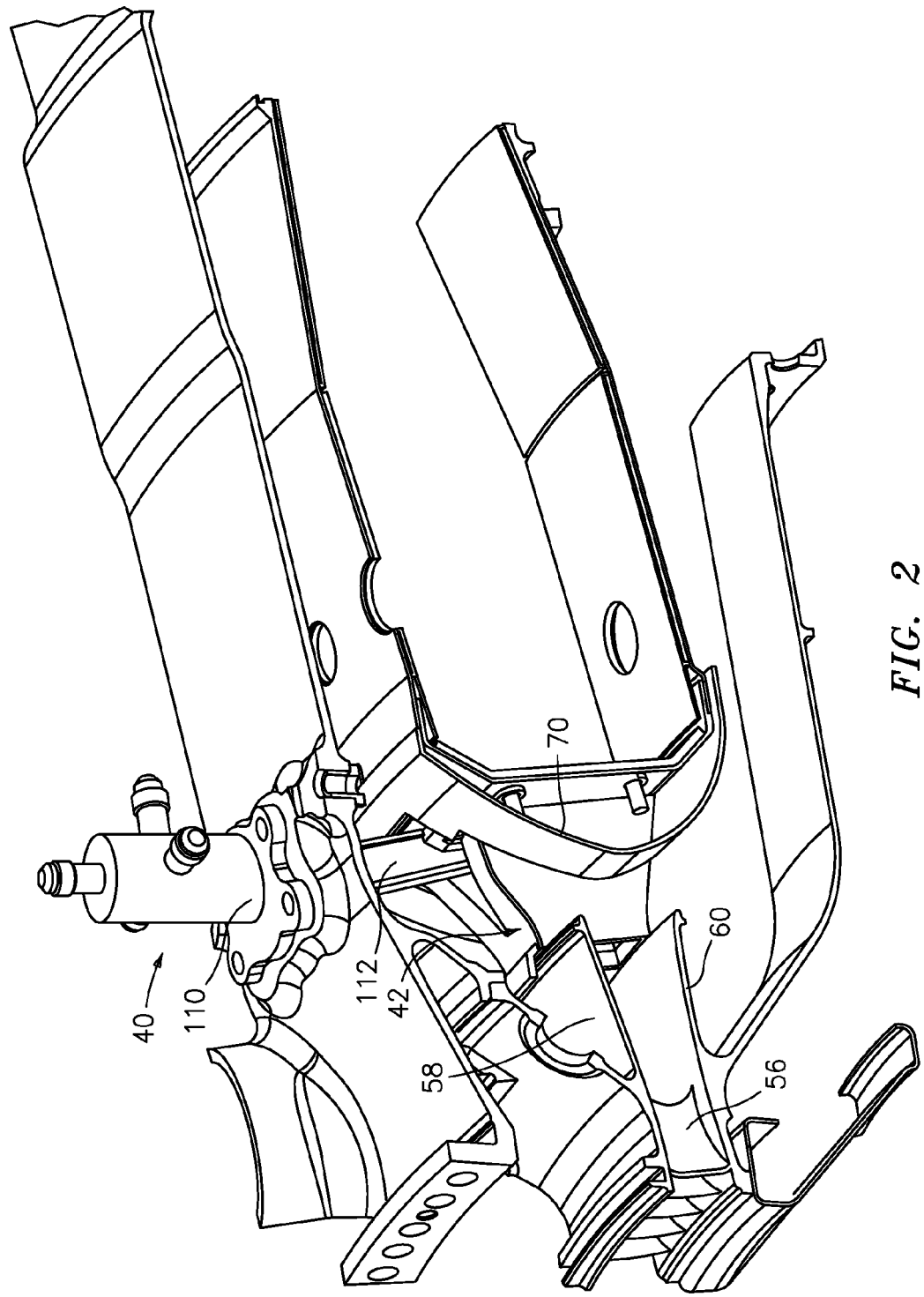
FIG. 2 is a first cutaway view of the combustor of FIG. 1.
Figure 3:
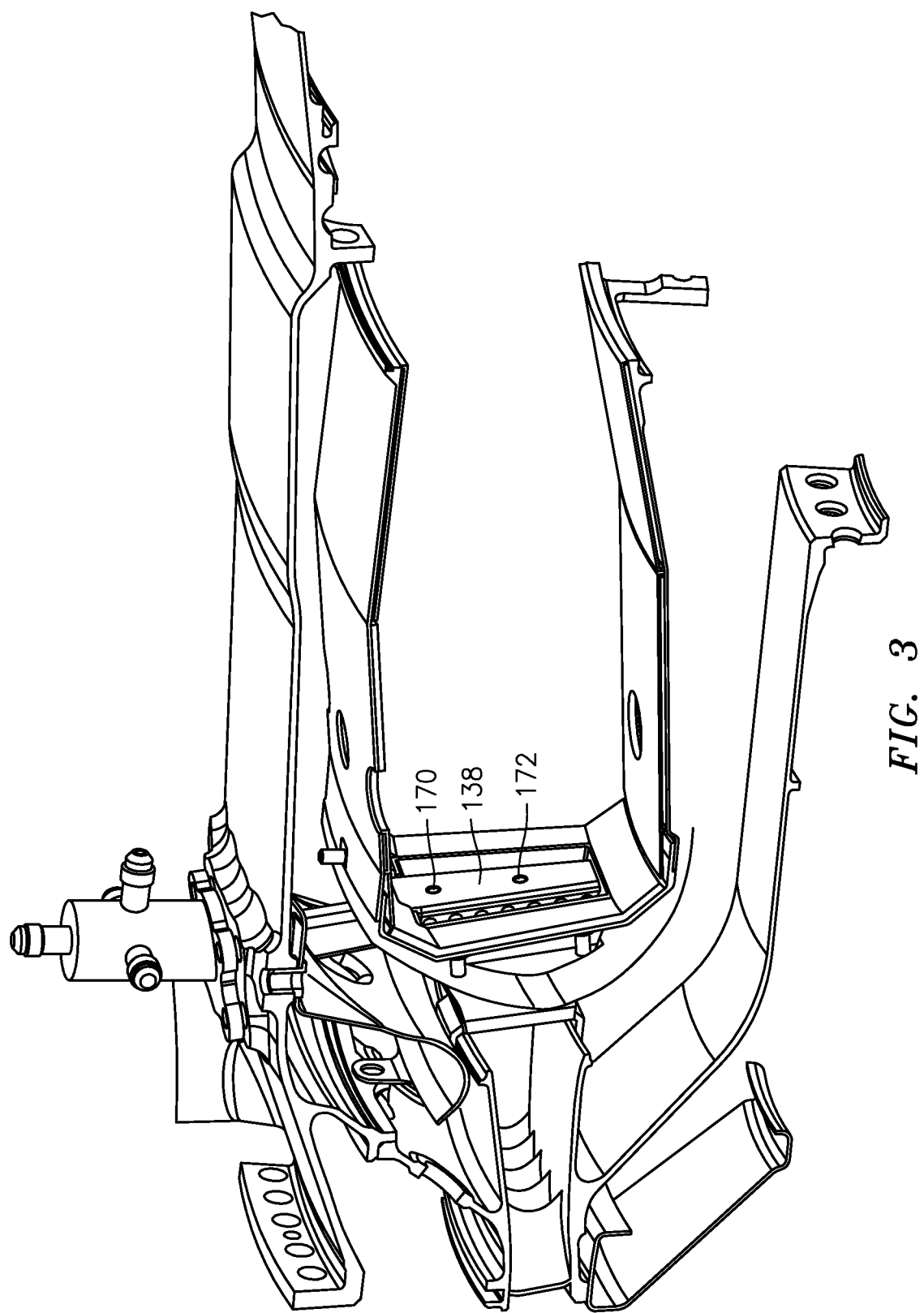
FIG. 3 is a second cutaway view of the combustor of FIG. 1.

FIG. 1 shows an exemplary combustor 20 positioned between compressor and turbine sections 22 and 24 of a gas turbine engine 26 having a central longitudinal axis or centerline (not shown). The exemplary combustor includes an annular combustion chamber 30 bounded by inner (inboard) and outer (outboard) walls 32 and 34 and a forward bulkhead 36 spanning between the walls. The bulkhead 36 accommodates outlet portions 38 of a circumferential array of fuel injectors 40 and associated air inlet ducts 42 (also see FIG. 2). The exemplary fuel injectors extend through the outboard wall 44 of the engine diffuser case 46 to convey fuel from an external source to the injectors.

The exemplary diffuser case 46 has an inboard wall 48. The diffuser case outboard and inboard walls 44 and 48 converge forwardly to join outboard and inboard walls 50 and 54 along an array of compressor discharge guide vanes 56 guiding an air flow 506. The walls 50 and 54 continue downstream as outboard and inboard walls 58 and 60 of a prediffuser 62 extending downstream within the diffuser. In the exemplary combustor, upstream ends of the ducts 42 engage the downstream end of the prediffuser 62 so that a portion (air flow 508) of the air flow 506 discharged by the prediffuser flows through each duct 42 and, therefrom, into the combustor. Alternatively, the ducts 42 may be positioned downstream of the end of the prediffuser 62 so that a free air gap exists between the ducts 42 and prediffuser 62. Remaining portions of the air discharged by the prediffuser may pass laterally (circumferentially) around the ducts 42 and are split into outboard and inboard flows 510 and 512 around a cowl 70 (also see FIG. 2) extending forward from the bulkhead. A fairing or shield 72 may guide the outboard flow 510 around the cowl 70. The outboard flow 510 passes into an outboard annular chamber 80 outboard of the wall 34. The inboard flow 512 passes through an inboard annular chamber 82 inboard of the wall 32.

One or more ignitors 84 (e.g., sparkplugs) are positioned with their working ends 86 along an upstream portion of the combustion chamber 30 to initiate combustion of the fuel/air mixture. The combusting mixture is driven downstream within the combustor along a principal flowpath 500 through a downstream portion to a combustor outlet 88.

The exemplary walls 32 and 34 are double structured, having respective outer shells 90 and 92 and inner heat shields. The exemplary heat shields are formed as multiple circumferential arrays (rings) of panels (e.g., inboard fore and aft panels 94 and 96 and outboard fore and aft panels 98 and 100). Exemplary panel and shell material are high temperature or refractory metal superalloys, optionally coated for thermal/environmental performance. Alternate materials include ceramics and ceramic matrix composites. Various known or other materials and manufacturing techniques may be utilized. In known fashion or otherwise, the panels may be secured to the associated shells such as by means of threaded studs integrally formed with the panels and supporting major portions of the panels with their exterior surfaces facing and spaced apart from the interior surface of the associated shell. The exemplary shells and panels are foraminate, with holes (not shown) passing cooling air from the air flows 510 and 512 in the annular chambers 80 and 82 into the combustion chamber 30. The exemplary panels may be configured so that the intact portions of their inboard surfaces are substantially frustoconical. Viewed in longitudinal section, these surfaces appear as straight lines at associated angles to the engine centerline/axis.

Figure 4:
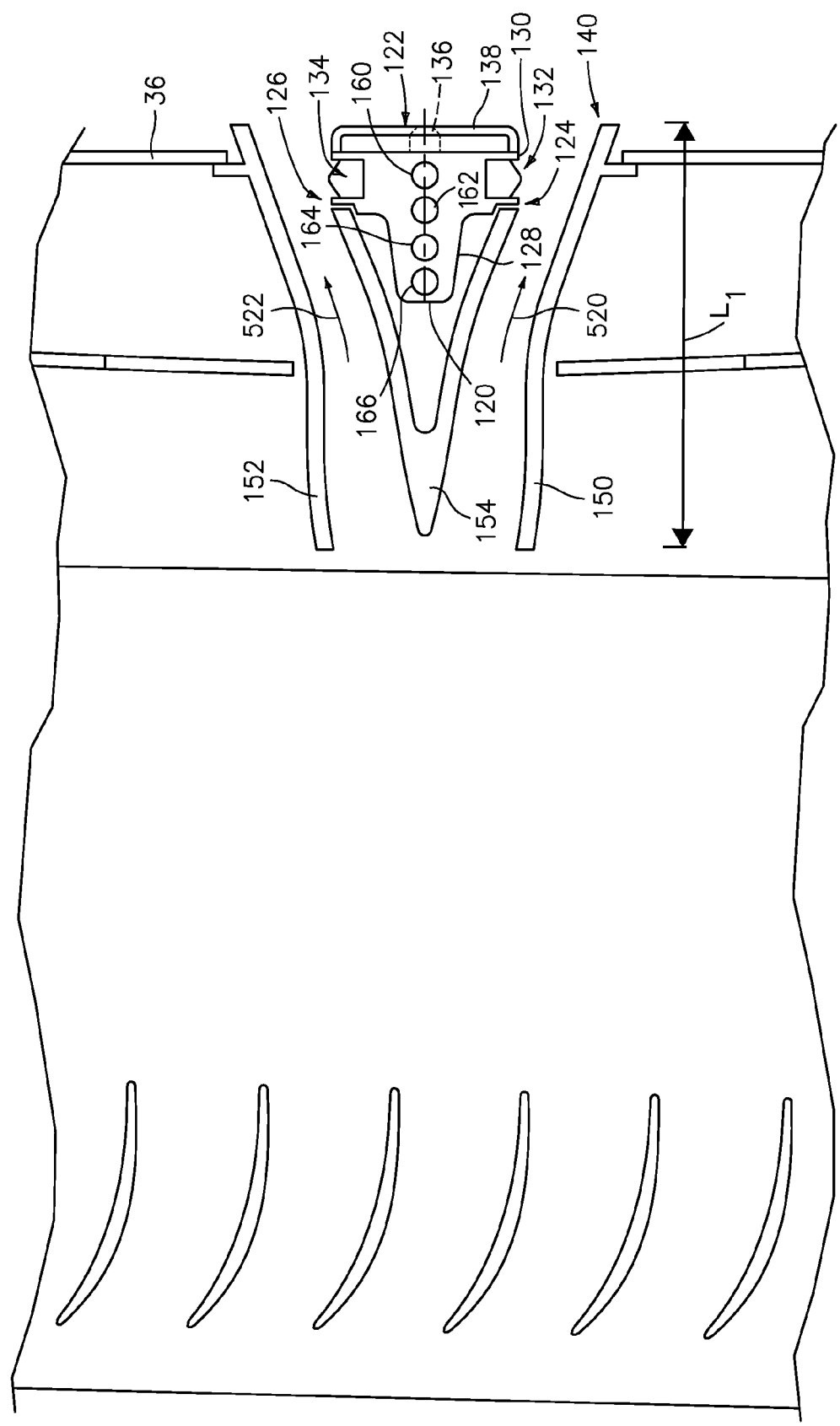
FIG. 4 is a partial circumferential sectional view of a bulkhead of the combustor of FIG. 1.

The exemplary fuel injector 40 of FIG. 1 includes an exterior base 110 mounted to the diffuser case outboard wall 44 and an injector leg 112 extending inward therefrom to a distal end 114. A portion 116 of the injector extends within the associated inlet duct 42. FIG. 4 shows further details of this portion. Along this portion 116, the leg 112 has a leading end 120, a trailing end 122, and first and second sides 124 and 126. The sides 124 and 126 each have a tapered leading portion 128 and a more nearly longitudinal trailing portion 130. Along the trailing portions 130, each side 124 and 126 has an array 132 and 134 of main fuel injectors. Along the trailing end 122 one or more pilot fuel injectors 136 are positioned protruding into a heat shield 138. The trailing end 122 is within an aperture 140 in the bulkhead 36.

Figure 5:
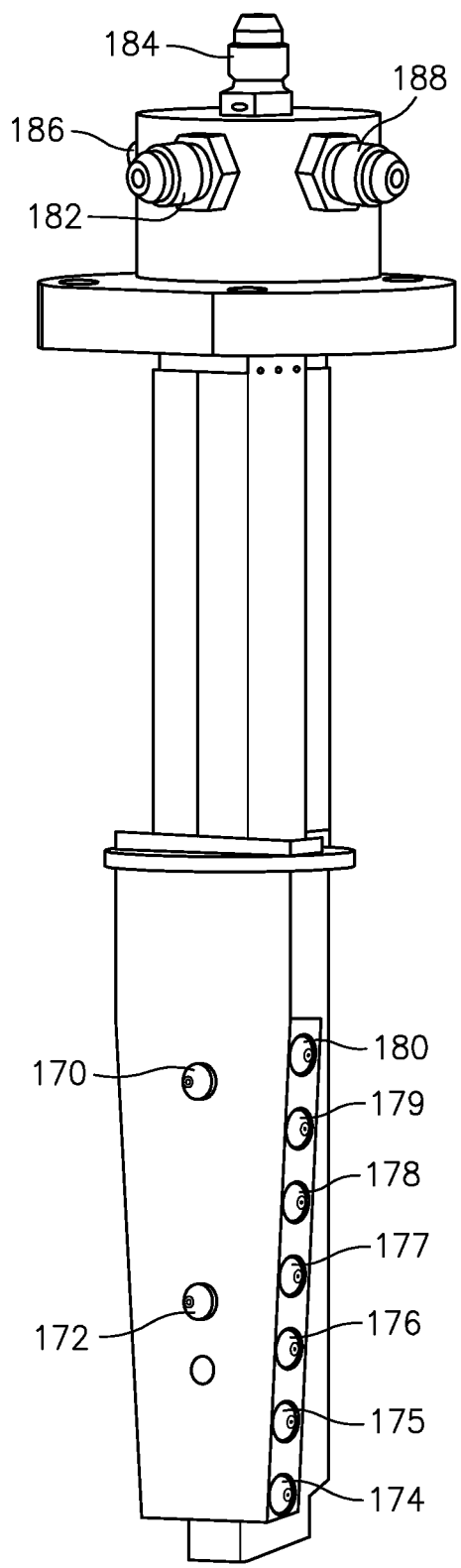
FIG. 5 is a view of a fuel injector.

FIG. 4 further shows first and second outboard lateral walls 150 and 152 of the associated duct 42. A divider wall 154 may be between the two and extend downstream to meet the injector leg upstream end 120 to divide the air flow 508 into portions 520 and 522 along either side of the injector leg. As is discussed further below, the injectors may be fed by a number of conduits 160, 162, 164, and 166. FIG. 5 shows further details of an exemplary injector 40. In the exemplary injector, the pilot nozzle array 136 includes first and second spaced apart nozzles 170 and 172. The lateral main fuel injector arrays 132 and 134 each include a plurality of nozzles (e.g., an exemplary seven nozzles shown arrayed from inboard to outboard 174, 175, 176, 177, 178, 179, and 180. In the exemplary injector, the pilot nozzles 170 and 172 are commonly fueled via fuel delivered through the conduit 160 attached to a fitting 182 in the base 110. Within each of the lateral arrays, groups of nozzles are commonly fueled, separate from the other groups. In one example, the outboardmost two nozzles 174 and 175 of both arrays are commonly fueled by the conduit 162 connected to a fitting 184. The inboard two nozzles 179 and 180 of both arrays are similarly commonly fueled by the conduit 164 connected to a fitting 186. The central group of nozzles 176, 177, and 178 of both arrays are commonly fueled by the conduit 166 connected to a fitting 188.

The fuel delivered through the three groups (or other number) may be proportioned to achieve desired combustion properties. For example, of the total fuel flowing through nozzles 174, 175, 176, 177, 178, 179, and 180; nozzles 174 and 175 may each flow 15% of this total flow; nozzles 176, 177, and 178 may each flow 10% of this total; and nozzles 179 and 180 may each flow 20% of this total amount. This is an example of a relatively lower fuel introduction concentration near the center of the radial span than near the inboard extremity and outboard extremity. Also, there is a slightly lower concentration near the inboard extremity than near the outboard so as to limit/reduce temperature near the roots of the rotating turbine components. The particular fuel distribution may be tailored to provide a desired temperature distribution. For example a computational fluid dynamics simulation or rig test may be performed and parameters iteratively varied/optimized.

Figure 6:
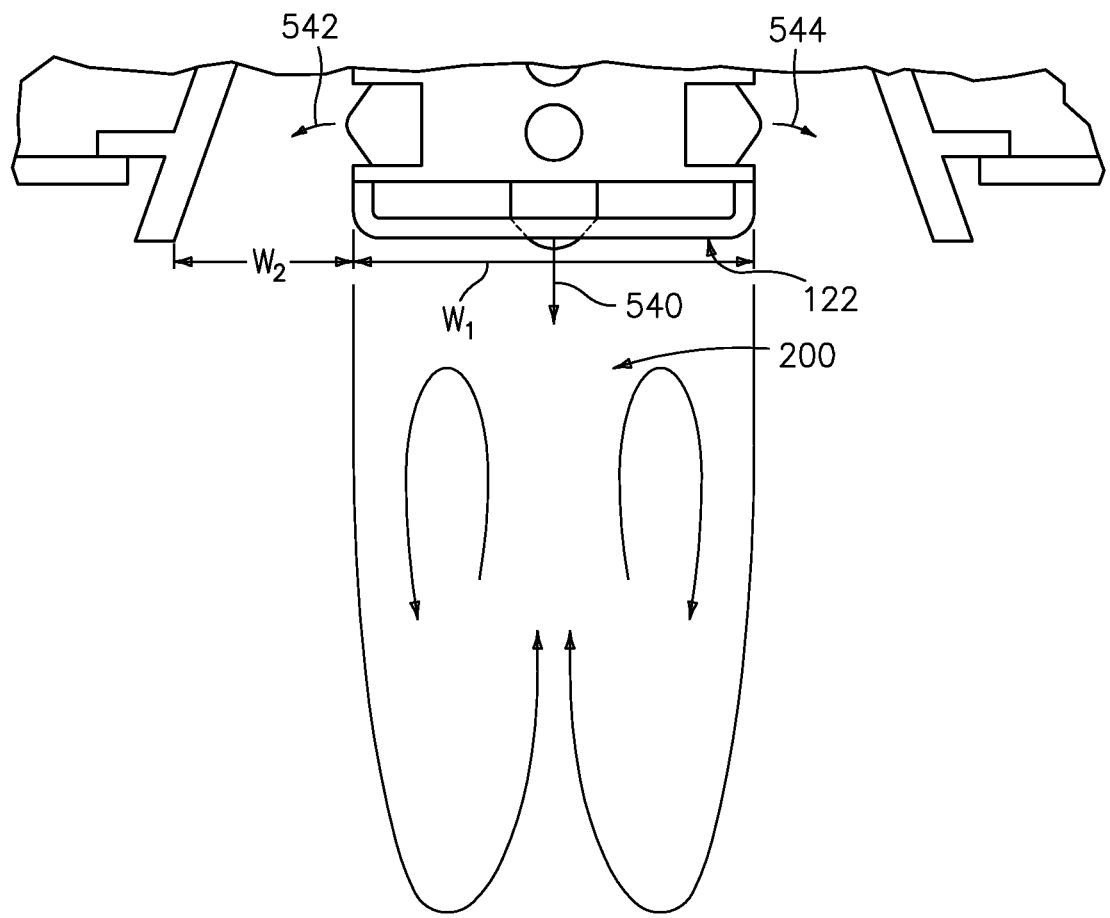
FIG. 6 is a view showing a recirculation downstream of the bulkhead of FIG. 3.

FIG. 6 shows fuel sprays 540, 542, and 544, respectively, discharged from the nozzle arrays. The pilot spray or fuel flow 540 enters a recirculation region 200 downstream of the trailing end 122. The relatively bluff (as opposed to streamlined) nature of this end 122 helps encourage turbulence in the recirculation region 200 to maintain combustion of the fuel from the pilot flow 540. In the exemplary configuration, the end 122 is shown as flat and generally rectangular having a width W1. Exemplary W1 are 10-50 mm, more narrowly 20-30 mm. At either side, the air flow passageways carrying the flows 520 and 522 have widths W2. Exemplary W2 is 10-50% of W1, more narrowly 12-20%. A length L1 (FIG. 4) of the end 122 and passageways may be greater than W1 (e.g., 200-400% of W1).

Exemplary implementations may be in an engineering or remanufacturing situation. A method involves engineering a gas turbine engine combustor having an inboard wall, an outboard wall, and a forward bulkhead extending the inboard and outboard walls and cooperating therewith to define a combustor interior volume. The exemplary method comprises: configuring the combustor to have air inlet passageway portions in the forward bulkhead, with non passageway portions therebetween; selecting width of the inlet passageway portions so as to provide a desired airflow; and selecting width of the non passageway portions so as to provide a desired flame stability. The stability may be determined (e.g., iteratively) by one or both of CFD and rig tests (e.g., ignition characteristics, lean blow out, smoke). The selecting width of the inlet passageway portions so as to provide a desired airflow may include measuring or observing smoke emissions at a maximum fuel-air ratio. The selecting width of the non passageway portions so as to provide a desired flame stability may include performing at least one of actual or simulated ignition rig tests and actual or simulated lean blowout tests. The engineering may serve to improve lean blowout performance relative to a baseline combustor being reengineered or replaced (i.e., lower the fuel-air ratio at which the combustor blows out). The engineering may be a reengineering from a baseline configuration to a reengineered configuration, the baseline configuration having a plurality of vortex swirlers and associated fuel injectors and the reengineered configuration lacking vortex swirlers.

Figure 7:
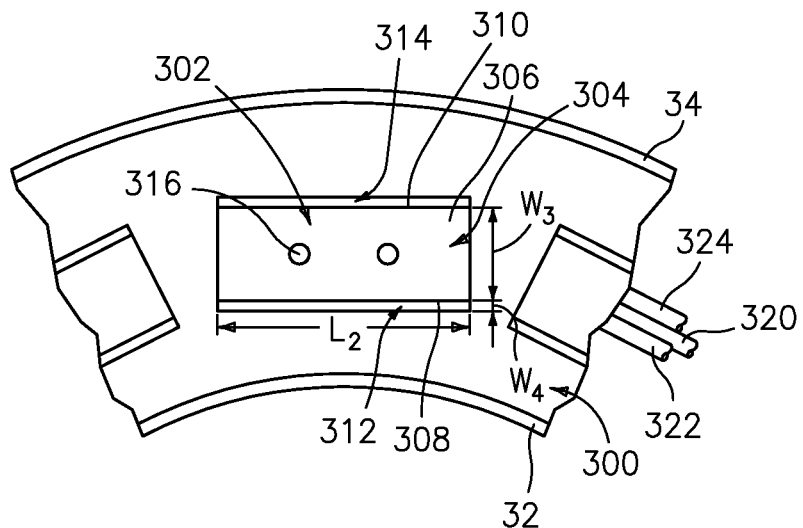
FIG. 7 is a downstream end view of an alternate bulkhead.

FIG. 7 shows an alternative bulkhead 300 between the inboard and outboard combustor walls 32 and 34. The bulkhead 300 carries a circumferential array of transversely/circumferentially elongate injectors 302. The injectors 302 each have a centerbody 304 having a bluff trailing end 306. Along inboard and outboard sides 308 and 310 of the body 304 are respective air passageways 312 and 314. An array 316 of pilot fuel nozzles are positioned in the end 306. Additional arrays (not shown) of fuel injectors are positioned along the sides 308 and 310 for injecting fuel into air flows respectively flowing through the passageways 312 and 314. The pilot, inboard, and outboard arrays may respectively be fueled by conduits 320, 322, and 324 illustrated as annular fuel plenums. These plenums may, in turn, be fed by an associated radial conduit (not shown) extending through the case. An exemplary body/passageway length is shown as $L_2$. An exemplary body width is shown as $W_3$. An exemplary air passageway width is shown as $W_4$. Other operational and construction details may be similar to the FIG. 1 embodiment.

Figure 8:
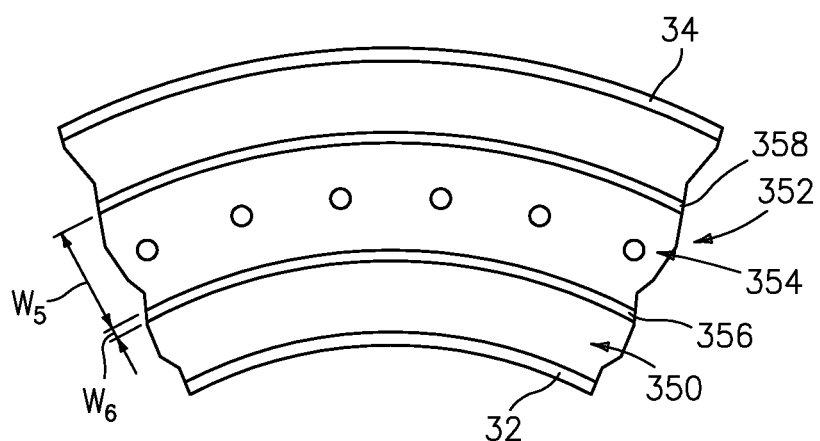
FIG. 8 is a downstream end view of a second alternate bulkhead.

FIG. 8 shows another alternate bulkhead 350. Relative to the FIG. 6 configuration, there is an injector 352 wherein a body 354 is a continuous annulus as are the passageways 356 and 358. Relative to the FIG. 6 embodiment, this roughly entails an extending and merging of the discrete injectors of the FIG. 6 embodiment. The exemplary radial span of the body 354 is shown as W5. An exemplary radial span of the passageways is shown as W6. Injector arrays on the trailing end and inboard and outboard sides of the body 354 may be similarly fueled to those of the FIG. 6 combustor.

One or more embodiments have been described. Nevertheless, it will be understood that various modifications may be made without departing from the spirit and scope of the invention. For example, when applied as a reengineering of an existing combustor, details of the existing combustor will influence details of the particular implementation. Accordingly, other embodiments are within the scope of the following claims.

What is claimed is:

1. A gas turbine engine combustor comprising:
   an inboard wall;
   an outboard wall;
   a forward bulkhead extending between the inboard and outboard walls and cooperating therewith to define a combustor interior volume; and
   at least one fuel injector along the forward bulkhead and comprising:

means for introducing fuel to a flow of air entering the interior volume for combusting the fuel and air; and means for inducing turbulence in a recirculation region downstream of a trailing end of the injector and promoting local flame stabilization of the combusting air and fuel, wherein:

the means for inducing comprises:

said trailing end of a body of the fuel injector being bluff; and the trailing end has a width between first and second air passageways of at least 10mm.

2. The combustor of claim 1 wherein:

the means for introducing comprises:

a first array of nozzles along a first side of a body of the fuel injector; and a second array of nozzles along a second side of the body opposite the first side.

3. The combustor of claim 2 wherein:

the first array of nozzles is at least partially separately fueled relative to the second array of nozzles.

4. The combustor of claim 2 wherein:

a first group of nozzles of the first and second arrays is separately fueled relative to a second group of nozzles of the first and second arrays.

5. The combustor of claim 1 wherein:

the means for introducing comprises:

a first radial array of nozzles along a first circumferential side of a leg of the fuel injector; and a second radial array of nozzles along a second circumferential side of the leg opposite the first circumferential side.

6. The combustor of claim 1 wherein:

the at least one fuel injector comprises a plurality of fuel injectors arrayed along the forward bulkhead.

7. The combustor of claim 6 wherein:

the fuel injectors are radially elongate and circumferentially arrayed.

8. The combustor of claim 6 wherein:

the fuel injectors are circumferentially elongate and circumferentially arrayed.

9. The combustor of claim 1 wherein the inboard and outboard walls each have an exterior shell and an interior multi panel heat shield.

10. The combustor of claim 6 wherein:

each said injector is associated with a respective duct; and each said duct comprises first and second outboard lateral walls.

11. The combustor of claim 2 wherein:

the injector further comprises at least one pilot fuel nozzle positioned to direct a pilot fuel from the bluff end; and the pilot fuel nozzle is within a radial span of the first array of nozzles and second array of nozzles between first and second air flowpaths on opposite sides of the injector to introduce said pilot fuel to the recirculation region.

12. A gas turbine engine combustor comprising:

an inboard wall;

an outboard wall;

a forward bulkhead extending the inboard and outboard walls and cooperating therewith to define a combustor interior volume; and a fuel injector system comprising:

an elongate body having first and second sides and a bluff end extending between the first and second sides;

a first air flowpath along the first side of the body;

a second air flowpath along the second side of the body;

a plurality of first fuel nozzles positioned to direct fuel to a first flow of air in the first air flowpath; and a plurality of second fuel nozzles positioned to direct fuel to a second flow of air in the second air flowpath, wherein:

there are a plurality of said injectors and a plurality of ducts, each said injector is associated with a respective said duct;

each said duct comprises first and second outboard lateral walls; and each said duct comprises a divider wall between the first and second outboard lateral walls and extending downstream to meet an upstream end of a leg of the injector to divide a flow of the air into portions along either side of the injector leg.

13. The combustor of claim 12 wherein:

at least one pilot fuel injector is mounted in the body within a radial span of the first air flowpath and second air flowpath and positioned to direct a pilot fuel from the bluff end.

14. The combustor of claim 12 wherein the body is elongate essentially radially.

15. The combustor of claim 12 wherein the body is elongate essentially circumferentially.

16. The combustor of claim 12 wherein the bluff end is essentially flat.

17. The combustor of claim 13 wherein:

the pilot fuel injector is between the first air flowpath and second air flowpath.

18. The combustor of claim 13 wherein:

the at least one pilot fuel injector is positioned to direct said pilot fuel into a recirculation region immediately downstream of said trailing end.

19. A gas turbine engine combustor comprising:

an inboard wall;

an outboard wall;

a forward bulkhead extending between the inboard and outboard walls and cooperating therewith to define a combustor interior volume; and at least one fuel injector along the forward bulkhead and comprising:

means for introducing fuel to a flow of air entering the interior volume for combusting the fuel and air; and means for inducing turbulence in a recirculation region downstream of a trailing end of the injector and promoting local flame stabilization of the combusting air and fuel, wherein:

the at least one fuel injector comprises a plurality of fuel injectors arrayed along the forward bulkhead;

each said injector is associated with a respective duct;

each said duct comprises first and second outboard lateral walls; and each said duct comprises a divider wall between the first and second outboard lateral walls and extending downstream to meet an upstream end of a leg of the injector to divide a flow of the air into portions along either side of the injector leg.

20. A gas turbine engine combustor comprising:

an inboard wall;

an outboard wall;

a forward bulkhead extending between the inboard and outboard walls and cooperating therewith to define a combustor interior volume; and at least one fuel injector along the forward bulkhead and comprising:

means for introducing fuel to a flow of air entering the interior volume for combusting the fuel and air; and means for inducing turbulence in a recirculation region downstream of a trailing end of the injector and promoting local flame stabilization of the combusting air and fuel, wherein:
the at least one fuel injector comprises a plurality of fuel injectors arrayed along the forward bulkhead;
each said injector is associated with a respective duct;
each said duct comprises first and second outboard lateral walls;
there is a prediffuser; and
each said duct has an upstream end of the duct engaging a downstream end of the prediffuser.

21. A gas turbine engine combustor comprising:
an inboard wall;
an outboard wall;
a forward bulkhead extending between the inboard and outboard walls and cooperating therewith to define a combustor interior volume; and
at least one fuel injector along the forward bulkhead and comprising:
means for introducing fuel to a flow of air entering the interior volume for combusting the fuel and air; and
means for inducing turbulence in a recirculation region downstream of a trailing end of the injector and promoting local flame stabilization of the combusting air and fuel, wherein:
there are passageways at respective sides of the injector, the passageways having a width which is 10-50% of a width of a bluff trailing end of the injector.

22. The combustor of claim 21 wherein:
the passageway width is 12-20% of the width of the bluff trailing end of the injector.

23. A gas turbine engine combustor comprising:
an inboard wall;
an outboard wall;
a forward bulkhead extending between the inboard and outboard walls and cooperating therewith to define a combustor interior volume; and
at least one fuel injector along the forward bulkhead and comprising:
means for introducing fuel to a flow of air entering the interior volume for combusting the fuel and air; and
means for inducing turbulence in a recirculation region downstream of a trailing end of the injector and promoting local flame stabilization of the combusting air and fuel, wherein:
viewed in longitudinal section, surfaces of circumferential arrays of panels forming the inboard and outboard walls appear as a series of straight line segments extending downstream from the forward bulkhead.

* * * * *